United States Patent
Ohr et al.

(10) Patent No.: US 10,865,852 B2
(45) Date of Patent: Dec. 15, 2020

(54) POWERTRAIN WITH CYCLOIDAL MECHANISM HAVING REINFORCED CONTACT SURFACES

(71) Applicant: SCHAEFFLER TECHNOLOGIES AG & CO. KG, Herzogenaurach (DE)

(72) Inventors: Carsten Ohr, Charlotte, NC (US); Peter Eisenhauer, Kaiserslautern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 337 days.

(21) Appl. No.: 15/919,462

(22) Filed: Mar. 13, 2018

(65) Prior Publication Data

US 2019/0285141 A1 Sep. 19, 2019

(51) Int. Cl.
*F16H 1/32* (2006.01)
*B60K 17/04* (2006.01)
*B60K 17/14* (2006.01)
*B60K 7/00* (2006.01)

(52) U.S. Cl.
CPC ............. *F16H 1/32* (2013.01); *B60K 7/0007* (2013.01); *B60K 17/046* (2013.01); *B60K 17/145* (2013.01); *B60K 2007/0092* (2013.01); *F16H 2001/325* (2013.01)

(58) Field of Classification Search
CPC ............ F16H 1/32; F16H 1/321; F16H 2001/322–328; B60K 2001/001; B60K 17/043–08; B60K 2007/0092
See application file for complete search history.

(56) References Cited

U.S. PATENT DOCUMENTS

| | | | |
|---|---|---|---|
| 9,297,364 B2 * | 3/2016 | Saenz De Ugarte Sevilla | ............ F16H 57/082 |
| 2010/0084872 A1 * | 4/2010 | Winiasz | .................. F03D 80/00 290/55 |

* cited by examiner

*Primary Examiner* — Erin D Bishop (57) ABSTRACT

A powertrain, such as a vehicular electric powertrain, includes a cycloidal speed reducer configured to reduce a speed of an output of a traction motor. The cycloidal speed reducer includes an input member configured to couple with the output of the traction motor. A cycloidal disc has a main body made of a first material and defining a plurality of circumferentially-arranged holes extending through the body. The cycloidal disc has a plurality of inserts each extending through one of the holes. The inserts are made of a second material. A plurality of circumferentially-arranged pins are each disposed in one of the holes and contacting one of the inserts. The inserts provide reinforcement in contact areas between the disc and the pins.

20 Claims, 5 Drawing Sheets

POWERTRAIN WITH CYCLOIDAL MECHANISM HAVING REINFORCED CONTACT SURFACES

TECHNICAL FIELD

The present disclosure relates to powertrains, and more specifically to powertrains that include one or more cycloidal mechanisms utilized as part of a gearbox and/or a differential.

BACKGROUND

Vehicles are more commonly including electric powertrains to improve fuel economy and reduce emissions. Electric powertrains utilize a traction motor to power driven wheels of the vehicle. The traction motor may be used in conjunction with an internal-combustion engine in hybrid vehicles. The traction motor is powered by a traction battery, fuel cell, or other electrical power source.

Electric motors may produce usable torque over a broader range of speeds than engines and typically do not require a multi-speed gearbox. Instead, electric powertrains typically include a one-speed gearbox that reduces shaft speed and multiplies torque for the driven wheels. A typical one-speed gearbox includes an input shaft fixed to motor, an output element (such as a ring gear), and a layshaft meshing between the input shaft and the output element power source.

SUMMARY

According to one embodiment, an electric powertrain for a vehicle includes a cycloidal speed reducer configured to reduce a speed of an output of a traction motor. The cycloidal speed reducer includes an input member configured to couple with the output of the traction motor. A cycloidal disc has a main body made of a first material and defining a plurality of circumferentially-arranged holes extending through the body. The cycloidal disc has a plurality of inserts each extending through one of the holes and being made of a second material. A plurality of circumferentially-arranged pins are each disposed in one of the holes and contacting one of the inserts. The first material may be steel, and the second material may be aluminum.

In another embodiment, a powertrain includes a traction motor including a stator, a rotor, and an output shaft fixed to the rotor. A cycloidal speed reducer is coupled to the traction motor. The cycloidal speed reducer includes a ring-pin assembly rotational fixed with the stator, encircling the output shaft, and having a plurality of circumferentially arranged ring pins. The cycloidal speed reducer includes an eccentric cam received on the output shaft. The cycloidal speed reducer includes a cycloidal disc made of a first material and defining (i) a central hole that receives the eccentric cam, (ii) a plurality of lobes circumferentially arranged about a perimeter of the cycloidal disc, and (iii) plurality of circumferentially-arranged holes extending therethrough. The cycloidal speed reducer includes a plurality of cylindrical inserts made of a second material and each disposed in one of the circumferentially-arranged holes.

In yet another embodiment, a cycloidal disc for an electric powertrain includes a main body made of a first material. The main body defines a central hole configured to receive an eccentric cam, a plurality of lobes circumferentially arranged about a perimeter of the main body, and a plurality of circumferentially-arranged holes extending therethrough. The cycloidal disc includes a central insert made of a second material and secured to the main body in the central hole, a plurality of inserts made of a third material and each secured to the main body in one of the circumferentially-arranged holes, and an outer ring made of a fourth material and extending about the perimeter of the main body and extending over the lobes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
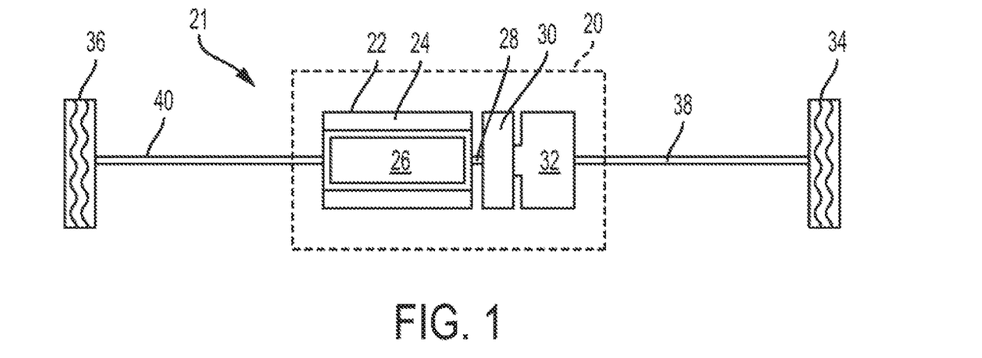
FIG. 1 is a schematic diagram of an electronic axle.

Referring to FIG. 1, an electric powertrain 20 may be used to power driven wheels of an electrified vehicle, such as a passenger car, truck, sport-utility vehicle, or crossover. In the illustrated embodiment, the electric powertrain 20 is part of an electric axle (e-axle) 21 that may be used as a front or rear drive axle of the electrified vehicle. In other embodiments, the electric powertrain 20 may be packaged as part of a hybrid transmission.

The powertrain 20 includes an electric machine 22, also referred to as a traction motor, that produces drive torque. The traction motor 22 may also act as a generator, such as during regenerative braking. The traction motor 22 may be powered by a traction battery (not shown). The traction motor 22 includes a stator 24 and a rotor 26 supported for rotation within the stator 24. An output shaft 28 of the traction motor 22 is rotationally fixed to the rotor 26. An end portion of the output shaft 28 is coupled to a speed reducer 30 configured to reduce speed of the output shaft 28 creating torque multiplication. An output member of the speed reducer 30 is coupled to a differential 32 configured to distribute the motor power between the first wheel 34 and the second wheel 36. The differential 32 is also configured to permit speed differences between the first and second wheels 34, 36 to facilitate cornering of the vehicle. A first half shaft 38 connects the differential 32 to the first wheel 34, and a second half shaft 40 connects the differential 32 to the second wheel 36. The term "half shaft" can refer to any shaft that transmits power from a differential to a driven wheel.

Referring to FIGS. 1-4, a speed reducer 30 is illustrated according to one embodiment, described more fully in U.S. patent application Ser. No. 15/890,613, the disclosure of which is incorporated entirely herein. Referring to FIGS. 1-4, the traction motor 22 includes a housing 44 having the stator 24 and the rotor 26 therein. The output shaft 28 is supported for rotation within the housing 44 and includes an end portion 45 that extends past an end face 46 of the housing 44. The stator 24 is rotationally fixed to the housing 44 and the rotor 26 is supported on the output shaft 28 so that the rotor 26 may rotate within the stator 24 and housing 44.

The end portion 45 of the output shaft 28 connects with an input member of the speed reducer 30. The speed reducer 30 may be a cycloidal speed reducer as illustrated. The speed reducer 30 may include a ring-pin assembly 48 mounted on the end face 46 rotationally fixed to the housing 44. The ring-pin assembly 48 may include an annular retainer 50 that supports a plurality of ring pins 52 circumferentially arranged around the retainer 50. The ring pins 52 may be configured to rotate relative to the retainer 50. For example, the ring pins 52 may include rotatable bushings or roller bearings that are supported by posts fixed to the retainer 50. The ring-pin assembly may have twenty-one ring pins 52, but in other embodiments more or less than twenty-one ring pins may be provided depending on design restraints.

The speed reducer 30 may also include at least one cycloidal disc radially disposed between the output shaft 28 and the ring-pin assembly 48. In the illustrated embodiment, two cycloidal discs 54 and 56 are used to reduce loads and provide balance. The first and second cycloidal discs 54, 56 each defines lobes 58 forming the circumferential perimeter of the disc, circular holes 60 circumferentially arranged and extending through the disc, and a central bore 62. The number of lobes 58 may be one less than the number of ring pins 52, and the number of holes 60 may be less than the number of lobes 58. In the illustrated embodiment, each disc 54, 56 has twenty lobes and ten holes. In other embodiments, however, the number of ring-pins, lobes, and holes may be increased or decreased to change the speed reduction and other characteristics.

The cycloidal discs 54, 56 are supported by eccentric cams 64, 66, which are the input members of the speed reducer 30. (If one cycloidal disc is used, then a single eccentric cam is used.) The eccentric cams 64, 66 are seated on the end portion 45 of the output shaft 28 with the cams 64, 66 rotationally fixed to the shaft 28. The first cam 64 is received in the central bore 62 of the first disc 54, and the second cam 66 is received in the central bore 62 of the second disc 56. The cams 64, 66 may be arranged on the shaft 28 with a phase difference between the cycloidal discs 54, 56. The phase difference may be between 170 and 200 degrees, and more preferably 180 degrees, to increase balance of the speed reducer 30. Bearings may be disposed between the central bores and the cams to reduce friction.

The eccentric cams 64, 66 input eccentric rotation into the cycloidal discs 54, 56, and the lobes 58 engage with the ring pins 52 to create an eccentric, cycloidal motion (also known as orbital or wobbling motion) of the disc 54, 56, which reduces the angular speed of the discs 54, 56 relative to the output shaft 28. The gear ratio of the speed reducer is equal to the number of ring pins minus one. In the illustrated embodiment, the speed reducer 30 includes 21 ring pins 52 creating a 20:1 ratio.

The speed reducer 30 further includes an output element 68 having a plurality of circumferentially arranged pins 70. The number of holes 60 and the number of pins 70 is equal. The illustrated embodiment includes ten holes 60 in each disc and ten pins 70. The discs 54 and 56 are arranged so that corresponding holes 60 are aligned allowing each pin 70 to extend though both discs 54, 56. The diameter of the pins 70 is less than the diameter of the holes 60 so that only a portion of the pins 70 are in contact with a portion of the holes 60. This facilitates the eccentric, cycloidal motion of the discs 54, 56 and gives the output element 68 concentric rotation.

The output element 68 is either coupled to a case 74 of the differential 32 or is a portion of the case 74. The case 74 is supported for rotation relative to the housing 44. The traction motor 22, the speed reducer 30, and the differential 32 may be coaxial. A cover (not shown) may be attached to the housing 44 and covers the speed reducer 30 and the differential 32. The cover may include features that support the differential 32. The case 74 may include a ring portion 76, a first end portion 78 that faces the speed reducer 30, and a second end portion 80. In the illustrated embodiment, the output element 68 is integrated with the case 74. The pins 70 extend from the first end portion 78 to couple the case 74 to the cycloidal disc 54, 56. The pins 70 may be integrally formed with the first end portion 78 or may be separate components that are connected to the end portion 78 by fasteners, welding, or other known attachment means. The pins 70 may be configured to rotate relative to the case 74 to reduce friction and provide smoother operation.

The disclosed cycloidal speed reducer can be smaller than gearboxes having spur or planetary gear sets. Packing space on vehicles is limited, especially for electronic axle applications, and using cycloidal speed reducers such as the one disclosed herein provides additional space for other components such as the traction motor. Cycloidal speed reducers are also capable of higher speed reduction, and inversely a higher torque multiplication, than spur or planetary gear sets of similar size. This enables a lower-torque, higher-speed motor to produce a same amount of power at the driven wheels. Lower-torque, higher-speed motors tend to be smaller and may be more economical. Cycloidal speed reducers also enable the powertrain 20 to be co-axial, whereas spur gears typically require the input and output shafts of the gearbox to be offset.

The differential 32 is configured to transmit torque produced by the traction motor, as multiplied by the speed reducer 30, to the driven wheels 34, 36. Many types of traditional differentials are known such as bevel-gear differentials, planetary differentials, spur-gear differentials, and the like, and the differential 32 may be of these types in some embodiments. These traditional types, however, tend to be bulky requiring sizable packaging space.

Figure 2:
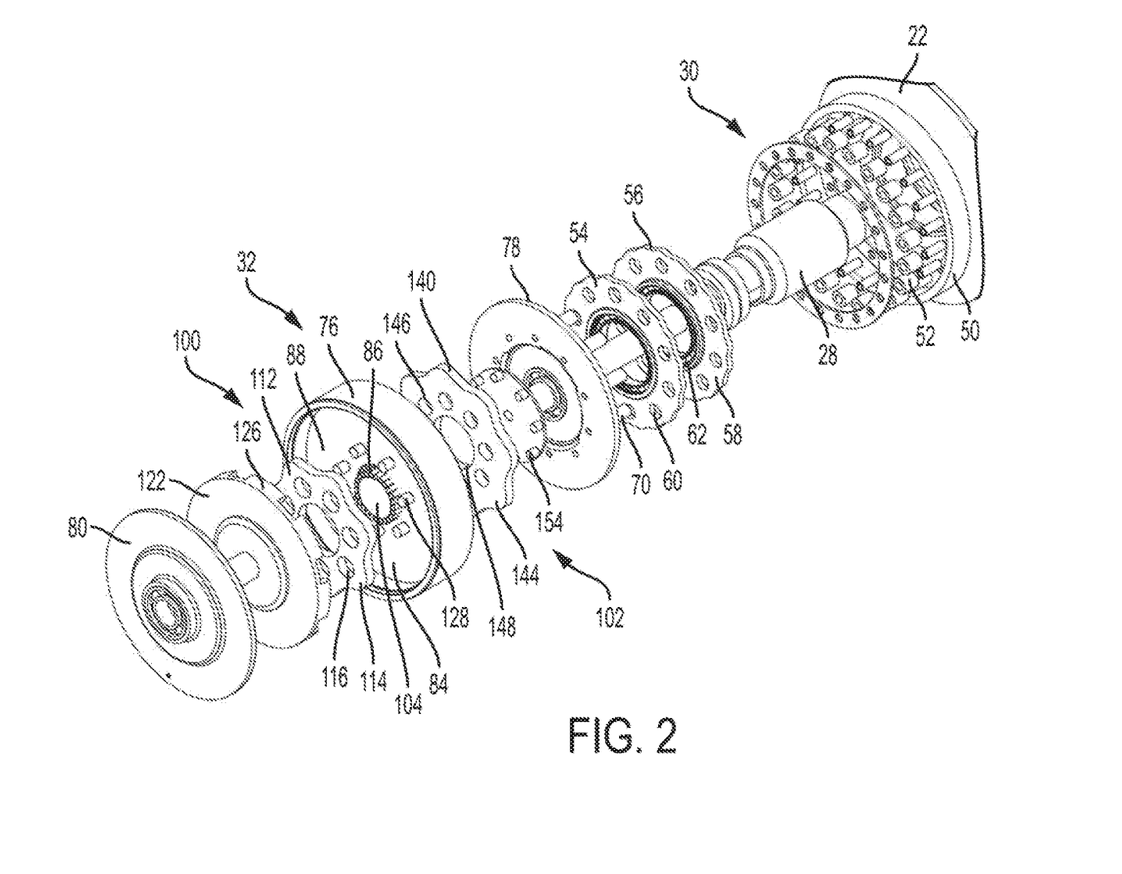
FIG. 2 is an exploded perspective view of one embodiment of an electric powertrain of the electronic axle.
Figure 3:
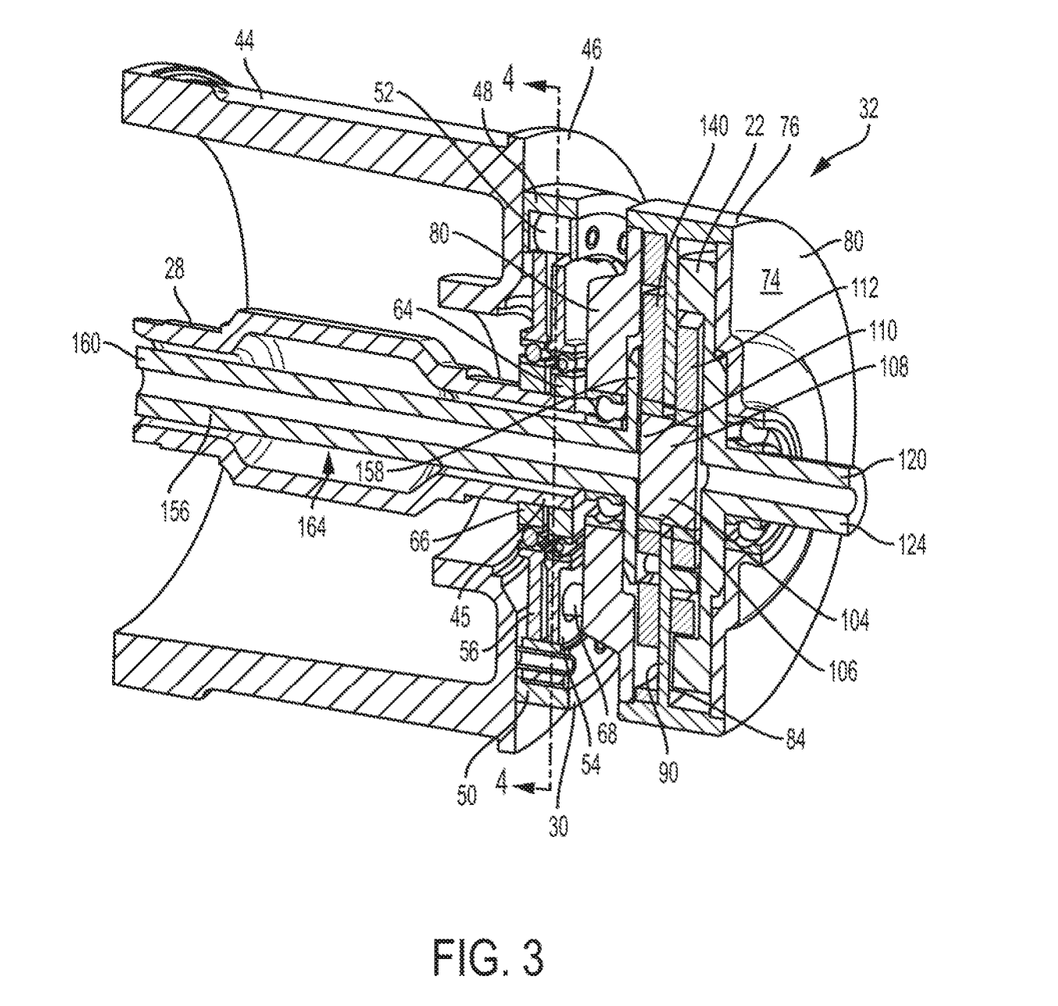
FIG. 3 is a perspective view, in cross section, of the electric powertrain of FIG. 2.
Figure 4:
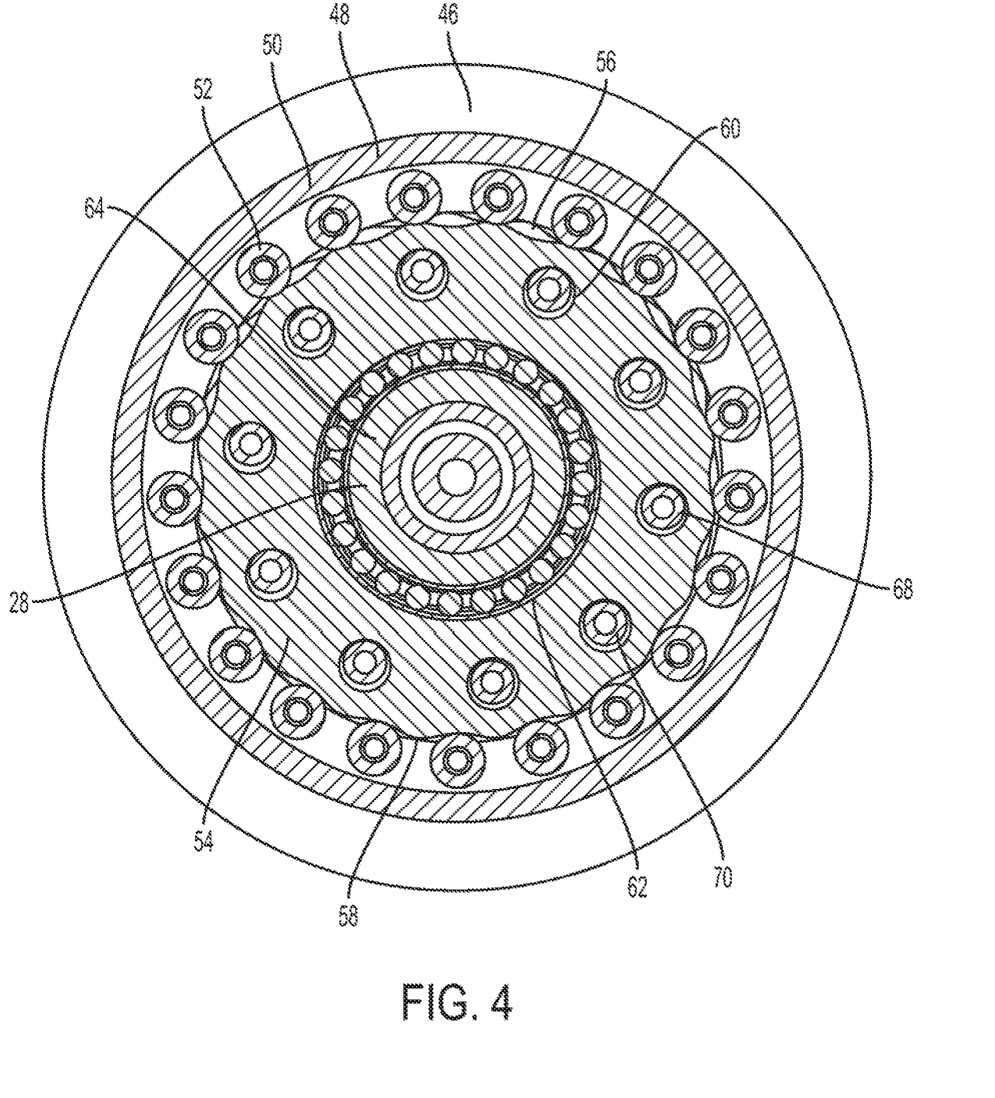
FIG. 4 is a cross-sectional view of a speed reducer of the electric powertrain along line 4-4 of FIG. 3, according to one embodiment.

The differential 32 according to the illustrated embodiment is a cycloidal differential in the illustrated embodiment. The cycloidal differential 32 may include a first drive 100 associated with the first half shaft 38 and a second drive 102 associated with the second half shaft 40. The case 74 of the differential 32 may include an intermediate wall 84, and the first and second drives 100, 102 may be disposed on opposite sides of the intermediate wall 84. The intermediate wall 84 defines a central bore 86 allowing one or more components to extend through the wall 84 to interconnect the drives 100, 102.

Each of the cycloidal drives 100, 102 have an output member configured to connect with one of the half shafts to supply power from the differential 32 to the driven wheels 34, 36. The differential 32 includes a coupling element that interconnects the first and second cycloidal drives 100, 102. The differential 32 is configured so that the output members, the coupling element, and the case 74 rotate at the same speed when the vehicle is traveling in a straight line. During a turn, the outside output member rotates faster than the case 74 and the inside output member rotates slower than the case 74, and the coupling element rotates faster than both of the output members making the differential 32 a hyper-cycloidal differential. In other embodiments, the differential 32 is a hypo-cycloidal differential in which the coupling element rotates slower than both of the output members.

The coupling member may be an eccentric shaft 104 having a circular portion 106 that is supported within the case 74. For example, a bearing may be interposed between the circular portion 106 and the central bore 86 to support the eccentric shaft 104 for rotation within the case 74. The eccentric shaft 104 may also have opposing eccentric discs 108 and 110 disposed on opposite ends of the shaft. The first cycloidal drive 100 may be connected to the first disc 108, and the second cycloidal drive 102 may be connected to the second disc 110. The first and second discs 108, 110 may have different center points creating a phase difference. The phase difference between the first and second discs may be between 170 and 200 degrees. In the illustrated embodiment, the phase difference is 180 degrees. A phase difference between the discs may not be required in all applications.

The first cycloidal drive 100 includes a cycloidal disc 112 (also known as a cycloidal cam) having lobes 114 forming the circumferential perimeter of the disc and circular holes 116 circumferentially arranged and extending through the disc 112. The number of lobes 114 and the number of holes 116 may be equal. In the illustrated embodiment, the disc 112 has seven lobes and seven holes. The cycloidal disc 112 defines a bore that is seated on the first eccentric disc 108. A bearing may be interposed between the disc 108 and the bore.

An output member 120 of the first drive 100 may include a flange portion 122 and a shaft portion 124. The shaft portion 124 may define splines or other features used to connect the output member 120 and the first half shaft 38. The disc 112 is connected to the output member 120 via a plurality ring pins 126 (also known as rollers). The ring pins 126 are circumferentially arranged on the flange portion 122 such that the ring pins 126 engage with the lobes 114 of the disc 112. The ring pins 126 may be stationary with respect to the flange portion 122 or may be rotatable about their axes. The ring pins 126 may be integrally formed with the flange portion 122.

Pins 128 (sometimes called rollers) of the first drive 100 may be attached to a first side 88 of the intermediate wall 84 by fasteners, welding or the like, or be integrally formed. The pins 128 are circumferentially arranged on the first side 88 so that the pins 128 are received within the holes 116 of the disc 112. The diameter of the pins 128 is less than the diameter of the holes 116 to facilitate the eccentric, cycloidal motion of the disc 112. The pins 128 revolve with the case 74 and are the input members of the first cycloidal drive 100. The drive 100 may include one more roller pin 126 than pins 128. In the illustrated embodiment, the drive 100 includes seven pins 128 and eight ring pins 126.

Similar to a planetary gear set, if one of the pins 128, output member 120, and eccentric shaft 104 is held static, then the other two components will rotate relative to each other at different speeds. For example, if the output member 120 is held static, the eccentric shaft 104 and the case 74 will rotate in opposite directions and at different speeds. In the illustrated embodiment, the case 74 will rotate eight times slower than the eccentric shaft 104.

The second cycloidal drive 102 includes a cycloidal disc 140 having lobes 144, circular holes 146, and a bore 148. The cycloidal disc 140 is supported by the eccentric shaft 104 with the bore 148 seated on the second eccentric disc 110. A bearing may be interposed between the disc 140 and the bore 148. In the illustrated embodiment, the disc 140 includes eight lobes 144 and eight holes 146.

The second cycloidal drive 102 may also include a plurality of ring pins attached to the case 74 or integrally formed with the case 74. These ring pins may be fixed or rotatable about their axes. The differential 32 may include a ring-pin plate that defines the ring pins, which are circumferentially arranged around an inner surface of the plate to engage with the disc 140.

The ring pins are circumferentially arranged to receive the disc 140 with the ring pins engaging the lobes 144 to facilitate the eccentric, cycloidal motion of the disc 140. The number of ring pins may be one more than the number of lobes 144. In the illustrated embodiment, the drive 102 includes eight lobes 144 and nine ring pins (similar to ring pins 126 described above). The ring pins are attached to the case 74 and are the input member of the second drive 102.

Pins 154 of the second drive 102 may be attached to an output member 156. The output member 156 may include a flange portion 158 and a shaft portion 160. The shaft portion 160 may define splines configured to connect with the second half shaft 40. The pins 154 are circumferentially arranged on the flange portion 158 so that the pins 154 are received within the holes 146 of the second cycloidal disc 140. A diameter of the pins 154 is smaller than the diameter of the holes 146 to facilitate the eccentric, cycloidal motion of the disc 140. The number of pins 154 may be one less than the number of ring pins. In the illustrated embodiment, the second drive 102 includes eight pins and nine ring pins.

The output member 156 is supported by the second end portion 80. The end portion 80 defines a central hole, and the shaft portion 160 extends through the hole. A bearing may be interposed between the hole and the shaft portion 160. The shaft portion 160 may extend through a hollow center 164 of the motor output shaft 28 so that the output member 156 may connect with the second half shaft 40.

Similar to the first drive 100, if one of the case 74, output member 156, and eccentric shaft 104 is held static, then the other two components will rotate relative to each other at different speeds. For example, if the case 74 is held static, the eccentric shaft 104 and the output member 156 will rotate in opposite directions and at different speeds. In the illustrated embodiment, the output member 156 will rotate eight times slower than the eccentric shaft 104.

In the illustrated embodiment, the first cycloidal drive 100 is a seventh-order drive (disc 112 has seven lobes) and the second cycloidal drive 102 is an eighth-order drive (disc 140 has eight lobes). By having one of the drives of m order and the other of m+1 order, the speed ratios between the output members 120, 156 are equal. While illustrated as having a seventh-order drive and an eighth-order drive, the differential 32 may have any combination of an m order drive and an m+1 order, where m is greater than or equal to 2.

Cycloidal differentials are configured to rotationally lock the first and second drives 100, 102 to the case 74, i.e., the cycloidal components within the case 74 do not rotate relative to the case 74, during straight line driving. Cycloidal differentials are further configured to, during cornering, allow relative movement of the components of the first and second drives 100, 102 during cornering to provide a 1:−1 ratio between the output members 120, 156. Further operation of the cycloidal differential is explained in U.S. patent application Ser. No. 15/890,613, which is incorporated by reference herein.

The structural components described above are but one embodiment. As stated, the number of lobes, pins, etc. can be altered to change the operation characteristics of the cycloidal drive. The cycloidal discs can be designed accordingly. In the above embodiments, the cycloidal discs may be machined and relatively thick to keep contact stresses small and to be able to use rolling bearings to minimize the differential friction. For higher loads, it may be beneficial to have long needles in the bearings to improve the bearing life. The cycloidal discs may therefore be too heavy for certain applications.

Figure 5A:
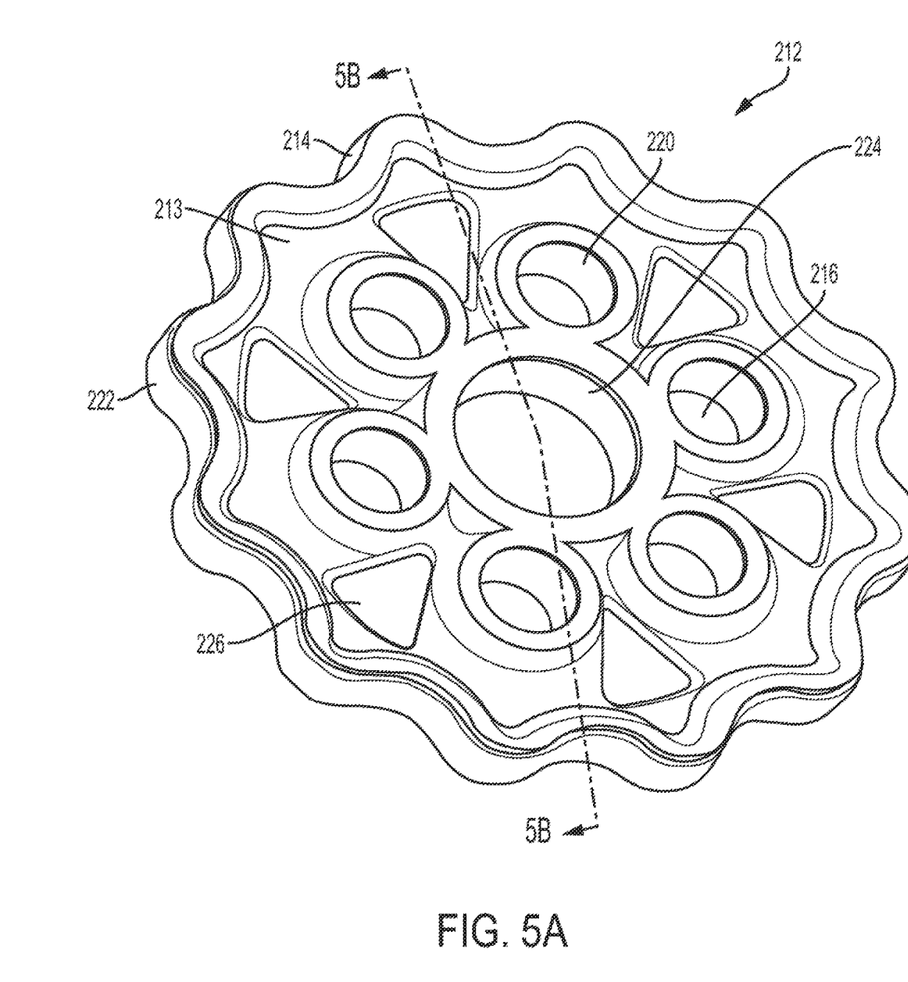
FIG. 5A is a perspective view of a cycloidal disc according to one embodiment.
Figure 5B:
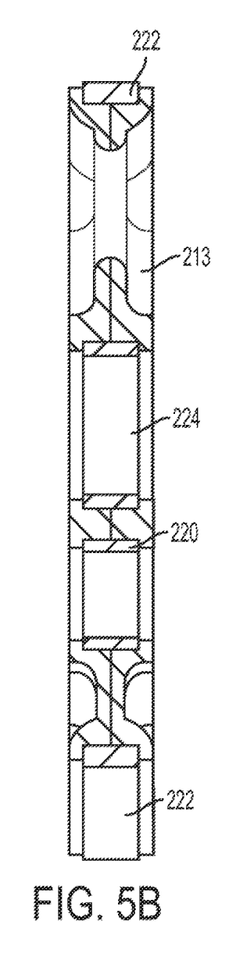
FIG. 5B is a cross-sectional view taken alone line 5B-5B of FIG. 5A.

Accordingly, FIGS. 5A-5B shows another embodiment of one of the cycloidal discs described above, and FIGS. 6A-6B show yet another embodiment of one of the cycloidal discs 54, 56, 112, 140 described above. The cycloidal discs of FIGS. 5-6 may substitute for the cycloidal disc 112 described above, for example.

Referring to FIGS. 5A-5B, a cycloidal disc 212 is shown. The cycloidal disc 212 has a reduces weight compared to the cycloidal disc 112 described above. The cycloidal disc 212 has a main body 213 that is cast, according to one embodiment. The main body 213 can be cast aluminum, or cast iron. This provides roughly a 50% or 10% weight savings, respectively, when compared to steel. The cycloidal disc includes lobes 214 forming the circumferential perimeter of the disc and circular holes 216 circumferentially arranged and extending through the disc 212. The number of lobes 214 may be double the number of holes 216, and in this illustrated embodiment there are six holes 216 and twelve lobes 214. The cycloidal disc 212 defines a bore that can be seated on the first eccentric disc 108 described above. A bearing may be interposed between the disc 108 and the bore. Also, the pins 128 may be received within the holes 216 of the disc 212, similar to the embodiment described above with reference to FIGS. 2-3.

The cycloidal disc 212 utilizes inserts at contact areas. In one example, steel inserts are provided. For example, cylindrical steel inserts 220 may be provided within the holes 216. Compared to the makeup of the main body 213, the inserts 220 may provide a localized region of strengthening material in the contacting areas of the holes 216 that contact the pins 128. The main body 213 may define drawn cups 218 extending axially from the main body 213 such that the region of material of the main body 213 (e.g., aluminum) has a greater axial dimension than that of the inserts 220.

The cycloidal disc 212 also may also have an outer ring 222 that can be made of the same material as the inserts, e.g., steel. The outer ring 222 can be pressed, adhered, or otherwise coupled to the perimeter of the main body 213 of the cycloidal disc 212, following the lobed profile of the main body. In one embodiment, the outer-most surface of the main body 213 is provided with a groove or recess sized to receive the outer ring 222. The outer ring 222 may provide a localized region of strengthening material in the outer contacting regions of the disc 212 where the disc 212 contacts the ring pins 126, for example.

The cycloidal disc 212 may also have a central ring 224 (or central insert) that can be made of the same material as the inserts, e.g., steel. The central ring 224 can be attached to an interior-most surface of the main body 213. This provides a localized region of strengthening material for the central shaft that passes through the cycloidal disc 212. The central ring 224 may also be an outer part of a bearing that connects the cycloidal disc 212 to the central shaft.

The cycloidal disc 212 may also have several cut-outs or voids 226 in areas of the main body 213 that do not contact any external components. These serve as weight-reducing voids.

Using the inserts 220, the outer ring 222, and the central ring 224 provides strengthening material such as steel in these contact areas in which the cycloidal disc 212 contacts other parts of the differential or transmission. Utilizing strengthening material in these contacting regions allows the main body 213 to be made from a lighter material (e.g., aluminum) without sacrificing strength where contact with external components is made.

Figure 6A:
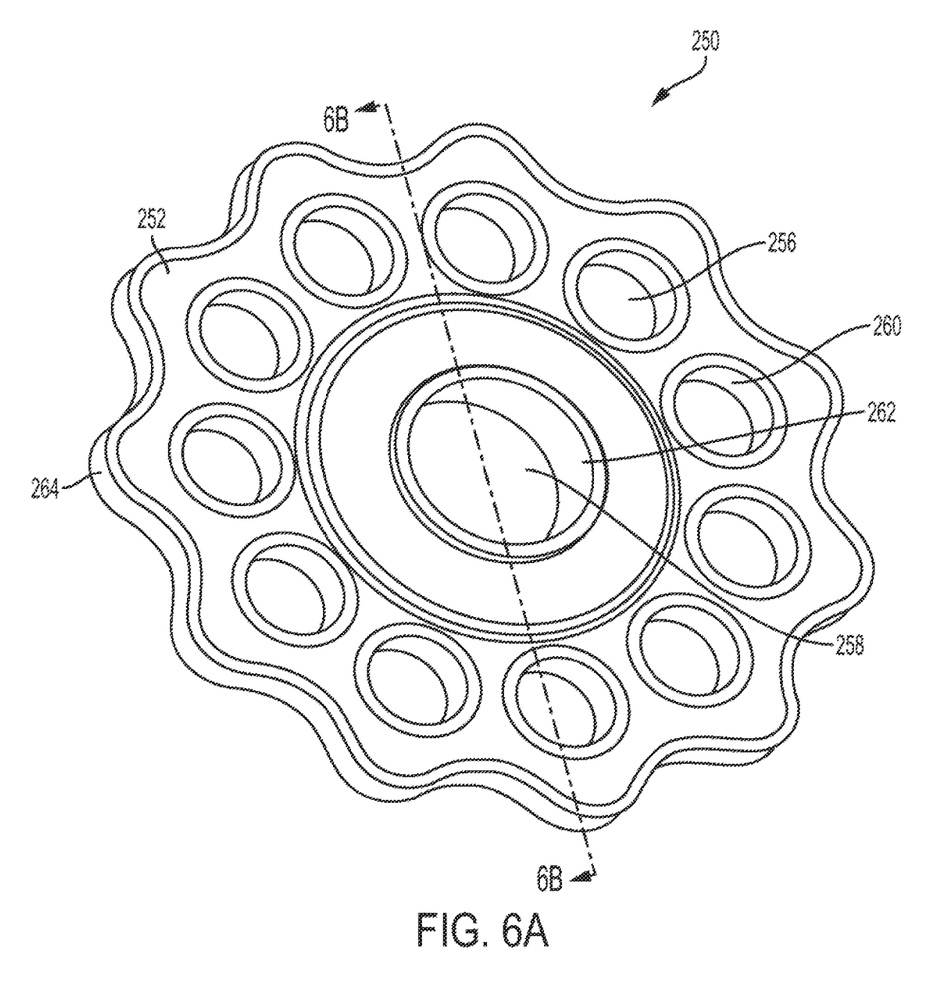
FIG. 6A is a perspective view of a cycloidal disc according to another embodiment.
Figure 6B:
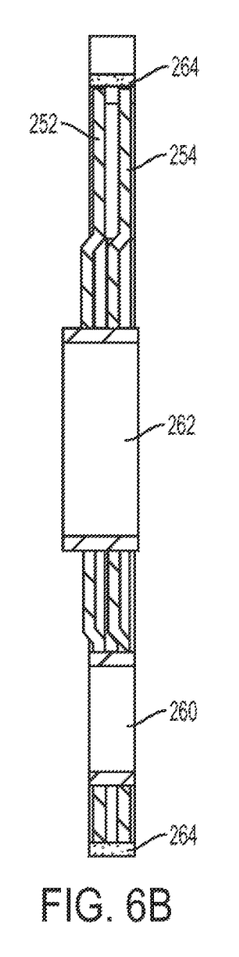
FIG. 6B is a cross-sectional view taken alone line 6B-6B of FIG. 6A.

Referring to FIGS. 6A-6B, another example of a cycloidal disc is shown. The cycloidal disc 250 includes a pair of plates 252, 254. The plates can be drawn from a blank, and can be identical to one another. The plates 252, 254 may form the main body of the cycloidal disc 250, and may be made of steel, for example, to facilitate the forming and welding process. The plates 252, 254 may be spaced apart such that a gap exists axially between the two. The plates can collectively form the holes 256 and center hole 258.

The cycloidal disc 250 may also utilize inserts at contact areas. In one example, inserts 260 (e.g., steel or another material different than the plates) are provided within the holes 256. Compared to the makeup of the plates, the inserts 260 may provide a localized region of strengthening material in the contacting areas of the holes 256 for contacting the pins. The inserts 260 may be cylindrical inserts that are flush with or extend axially beyond the faces of the plates 252, 254. The inserts 260 may be welded to the plates 252, 254 such that the plates are connected to each other via the welded inserts 260.

The cycloidal disc 250 may also include a central ring 262 (or central insert) that can be made of the same material as the inserts 260, e.g., steel. The central ring 262 can be welded to an interior-most surface of the plates 252, 254. This provides a localized region of strengthening material for the central shaft that passes through the cycloidal disc 250, and also attaches the two plates together. The central ring 262 may also be an outer part of a bearing that connects the cycloidal disc 250 to the central shaft.

The cycloidal disc 250 also may also have an outer ring 264 that can be made of the same material as the inserts, e.g., steel. The outer ring 264 can be formed, rolled to shape, and welded to the plates 252, 254 to again provide as a connection point between the two plates. As illustrated, the outer ring 264 undulates to cover the shape of the lobes of the cycloidal disc.

In the embodiments of FIGS. 5-6, the inserts may be made of one material, the central insert made be made of that material or another material, and the outer ring may be made of the same material as the inserts and central insert or of another material. The material of the inserts and central insert and outer ring may be steel, for example.

A benefit of the design shown in FIGS. 6A-6B is that the cycloidal disc 250 achieves a maximum contact length for the contacting components (e.g., bearing rolling elements and contacting pins) while minimizing the material in the areas connecting the contact areas. In other words, the inserts 260, central ring 262, and outer ring 264 serve as the entire contacting region of the cycloidal disc for contacting other components, and the amount of other material in the cycloidal disc 250 is reduced by having two spaced-apart plates connected by the welded contacting regions.

While the cycloidal disc and associated components are referenced above with respect to an electric powertrain, it should be understood that the present disclosure is not necessary limited to electric powertrains of a vehicle. For example, the cycloidal disc and associated gearing and componentry can be used in lighter plates in industrial applications, such as wind turbines and the like.

PARTS LIST

- 20 electric powertrain
- 21 electric axle
- 22 electric machine
- 24 stator
- 26 rotor
- 28 output shaft
- 30 speed reducer
- 32 differential
- 34 first wheel
- 36 second wheel
- 38 first half shaft
- 40 second half shaft
- 44 housing
- 45 end portion
- 46 end face
- 48 ring pin assembly
- 50 annular retainer
- 52 ring pins
- 54 cycloidal disc
- 56 cycloidal disc
- 58 lobes
- 60 holes
- 62 central bore
- 64 eccentric cam
- 66 eccentric cam
- 68 output element
- 70 pins
- 74 case
- 76 ring portion
- 78 end portion
- 80 second end portion
- 84 intermediate wall
- 86 central bore
- 88 first side of intermediate wall
- 100 first cycloidal drive
- 102 second cycloidal drive
- 104 eccentric shaft
- 106 circular portion
- 108 first eccentric disc
- 110 second eccentric disc
- 112 cycloidal disc
- 114 lobes
- 116 circular holes
- 120 output member
- 122 flange portion
- 124 shaft portion
- 126 ring pins
- 128 pins
- 140 cycloidal disc
- 144 lobes
- 146 circular holes
- 148 bore
- 154 pins
- 156 output member
- 158 flange portion
- 160 shaft portion
- 164 hollow center
- 212 cycloidal disc
- 213 main body
- 214 lobes
- 216 holes
- 218 drawn cups
- 220 inserts
- 222 outer ring
- 224 central ring
- 226 voids
- 250 cycloidal disc
- 252 plate
- 254 plate
- 256 holes
- 258 center hole
- 260 inserts
- 262 central ring
- 264 outer ring While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electric powertrain for a vehicle, the electric powertrain comprising:
    a cycloidal speed reducer configured to reduce a speed of an output of a traction motor, the cycloidal speed reducer including
        an input member configured to couple with the output of the traction motor,
        a cycloidal disc having a main body made of a first material and defining a plurality of circumferentially-arranged holes extending through the body, the cycloidal disc further having a plurality of inserts each extending through one of the holes and being made of a second material, and
        a plurality of circumferentially-arranged pins each disposed in one of the holes and contacting one of the inserts.

2. The electric powertrain of claim 1, further comprising a differential including a case connected to each of the pins.

3. The electric powertrain of claim 1, wherein the second material is different from the first material.

4. The electric powertrain of claim 3, wherein the second material is steel.

5. The electric powertrain of claim 1, wherein the main body includes a plurality of lobes circumferentially arranged about a perimeter thereof, and wherein an outer ring is secured to the perimeter and extends about the lobes.

6. The electric powertrain of claim 5, wherein the outer ring is made of a material different than the first material.

7. The electric powertrain of claim 5, wherein the main body of the cycloidal disc includes a pair of spaced-apart plates.

8. The electric powertrain of claim 5, wherein the outer ring is welded to the perimeter of the main body.

9. A powertrain comprising:
a traction motor including a stator, a rotor, and an output shaft fixed to the rotor; and
a cycloidal speed reducer coupled to the traction motor and including
a ring-pin assembly rotational fixed with the stator, encircling the output shaft, and having a plurality of circumferentially arranged ring pins,
an eccentric cam received on the output shaft,
a cycloidal disc made of a first material and defining (i) a central hole that receives the eccentric cam, (ii) a plurality of lobes circumferentially arranged about a perimeter of the cycloidal disc, and (iii) plurality of circumferentially-arranged holes extending therethrough, and
a plurality of cylindrical inserts made of a second material and each disposed in one of the circumferentially-arranged holes.

10. The powertrain of claim 9, wherein the second material is different from the first material.

11. The powertrain of claim 10, wherein the second material is steel.

12. The powertrain of claim 10, further comprising an outer ring secured to the perimeter of the cycloidal disc and extending over a radial outer surface of the lobes.

13. The powertrain of claim 12, wherein the outer ring is rolled and formed to shape, and is welded to the perimeter of the cycloidal disc.

14. The powertrain of claim 12, wherein the outer ring is made of a material that differs from the first material.

15. The powertrain of claim 12, wherein the cycloidal disc includes a pair of spaced-apart plates both welded to the outer ring.

16. A cycloidal disc for an electric powertrain, the cycloidal disc comprising:
a main body made of a first material and defining
a central hole configured to receive an eccentric cam,
a plurality of lobes circumferentially arranged about a perimeter of the main body, and
a plurality of circumferentially-arranged holes extending therethrough;
a central insert made of a second material and secured to the main body in the central hole;
a plurality of inserts made of the second material and each secured to the main body in one of the circumferentially-arranged holes; and
an outer ring made of the second material and extending about the perimeter of the main body and extending over the lobes.

17. The cycloidal disc of claim 16, wherein the the second material is different from the first material.

18. The cycloidal disc of claim 16, wherein the second material is steel.

19. The cycloidal disc of claim 16, wherein the main body is defined by a pair of spaced-apart plates each secured to the outer ring.

20. The cycloidal disc of claim 19, wherein the plates are welded to the plurality of inserts and to the outer ring.

* * * * *